(12) United States Patent  
Juutinen

(10) Patent No.: US 6,368,463 B1  
(45) Date of Patent: Apr. 9, 2002

(54) ARRANGEMENT FOR ADJUSTING WIDTH OF FIBRE WEB

(75) Inventor: Vesa Juutinen, Tampere (FI)

(73) Assignee: Metso Paper Inc., Helsinki (FI)

( * ) Notice: Subject to any disclaimer, the term of this patent is extended or adjusted under 35 U.S.C. 154(b) by 0 days.

(21) Appl. No.: 09/889,533

(22) PCT Filed: Jan. 18, 2000

(86) PCT No.: PCT/FI00/00037

§ 371 Date: Aug. 23, 2001

§ 102(e) Date: Aug. 23, 2001

(87) PCT Pub. No.: WO00/43588

PCT Pub. Date: Jul. 27, 2000

(30) Foreign Application Priority Data

Jan. 19, 1999 (FI) .................................................. 990103

(51) Int. Cl.[7] .................................................. D21F 1/80
(52) U.S. Cl. ..................... 162/301; 162/305; 162/358.1; 100/118; 210/401
(58) Field of Search ................................. 162/297, 301, 162/305, 358.1; 210/400, 401, 450; 100/118

(56) References Cited

U.S. PATENT DOCUMENTS

| | | | | | |
|---|---|---|---|---|---|
| 2,956,623 | A | * | 10/1960 | Ikavalko | 162/338 |
| 3,840,429 | A | * | 10/1974 | Busker et al. | 162/205 |
| 4,124,441 | A | * | 11/1978 | Nykopp | 162/301 |
| 4,802,955 | A | * | 2/1989 | Koski | 162/301 |

FOREIGN PATENT DOCUMENTS

| | | | |
|---|---|---|---|
| DE | 539 372 | * | 11/1931 |
| SE | 465 132 | * | 7/1991 |

* cited by examiner

Primary Examiner—Dean T. Nguyen  
(74) Attorney, Agent, or Firm—Alston & Bird LLP

(57) ABSTRACT

An arrangement for adjusting the width of a fibre web in an apparatus comprising two filter wires permeable to water, the filter wires having the same direction of travel, and a conduit for placing pulp suspension between the wires. The arrangement comprises channel for feeding water between the wires and to the edges thereof.

7 Claims, 2 Drawing Sheets

ARRANGEMENT FOR ADJUSTING WIDTH OF FIBRE WEB

BACKGROUND OF THE INVENTION

1. Field of the Invention

The invention relates to an arrangement for adjusting the width of a fibre web when water is removed from pulp suspension in an apparatus comprising two filter wires permeable to water, the filter wires having the same direction of travel and both wires being arranged to be supported by surfaces equipped with water openings and to form therebetween a gap narrowing in the direction of travel, and side parts located on both edges of the gap to prevent the pulp suspension from being extruded out of the gap in the crosswise direction thereof, the openings in the upper and lower surfaces of the gap being formed such that the both surfaces comprise a solid edge part next to the side parts such that the edges of the wires extend over said solid edge parts, and means for feeding the pulp suspension into the gap between the wires in the inlet direction thereof.

2. Description of Related Art

When water is removed from pulp suspension when, for example, ash or other impurities are washed off it, the pulp is usually fed to a gap-like space confined by wires. Behind the wires, there are supporting surfaces equipped with holes or other openings, whereby the water can be removed via the wires and further via the openings thereof. It is also known that openings cannot be used in the supporting structure at the edges of the wires running in the gap but the supporting structure must have a solid section at the edge part of the gap in order to prevent the pulp from penetrating under the edges of the wire. On the sides of such a gap there are also provided side plates to close the gap such that the pulp suspension is not extruded out of the gap to the sides thereof but proceeds towards the outlet opening of the gap in the direction of travel of the wire. The gap is shaped so as to narrow in the direction of flow of the pulp suspension such that the pulp suspension is pressed against the wires; consequently, the water flows through the wire. The problem with such an apparatus is that the pulp suspension tends to become pressed to the edges of the wire and further under the edges thereof, thereby dirtying the edges of the wires and, furthermore, the pulp suspension splatters all over at the outlet opening of the gap, dirtying the apparatus. In order to prevent the above, it is known to use water jets to wash the pulp off the edge of the wire and thus to prevent the edge of the wire from becoming dirty and the pulp from being splattered all over. This solution is, however, rather difficult since using water jets necessarily causes splashes and it is difficult to collect the water and the fibre material removed by the water jets.

Attempts have also been made to utilise various sealing elements to block the gap between the wires so that the pulp suspension cannot be extruded from the edge. The problem with this solution is that the wires equipped with seals are extremely expensive and, furthermore, their service life is quite short. The use of separate seals, in turn, has proved to be difficult in practice since the pulp suspension penetrates extremely easily between the wires and the seals before the actual sealing is performed. Controlling the separate seals has also proved to be difficult, and the seals tend to wear quickly.

SUMMARY OF THE INVENTION

An object of the invention is to provide a solution by which the disadvantages of the known solutions are avoided and which is easy to implement. An arrangement of the invention is characterized in that the arrangement comprises means for feeding water to the sides of the gap such that while flowing together with the pulp suspension towards the outlet opening of the gap, the supplied water pushes the pulp suspension towards the centre of the gap at least substantially as far as to the openings in the upper and lower surfaces.

The basic idea of the invention is that such an amount of water is fed into the gap to the sides thereof that the water is pressed towards the centre of the gap as the height of the gap decreases, the water simultaneously pushing the pulp suspension away from the edge of the gap, whereby the web that exits from the chamber between the two wires is narrower than the wires, the edge of the wire becoming substantially purified of pulp. The advantage of the invention is that an extremely small amount of water can push the pulp from the edge of the gap towards the centre thereof. The supplied water, which retains its volume, penetrates towards the centre of the gap as the height of the gap decreases, simultaneously narrowing the web until the openings in the supporting structure on the other side of the wires allow excess water to be removed from the gap; consequently, the pulp remains on the wire substantially along the entire width between the extreme openings. The water not only pushes the pulp from the edge of the gap towards the centre thereof but also washes the edges of the wire substantially clean, thereby substantially preventing splashing at the outlet end of the gap or the apparatus from becoming dirty. The feeding of water in accordance with the invention is also extremely easy to implement by placing only one or more water feeding hoses or channels in the side plates of the gap, for example; no other separate equipment is necessary.

BRIEF DESCRIPTION OF THE DRAWINGS

The invention will be described in closer detail in the accompanying drawings, in which.

DETAILED DESCRIPTION OF A PREFERRED EMBODIMENT

Figure 1:
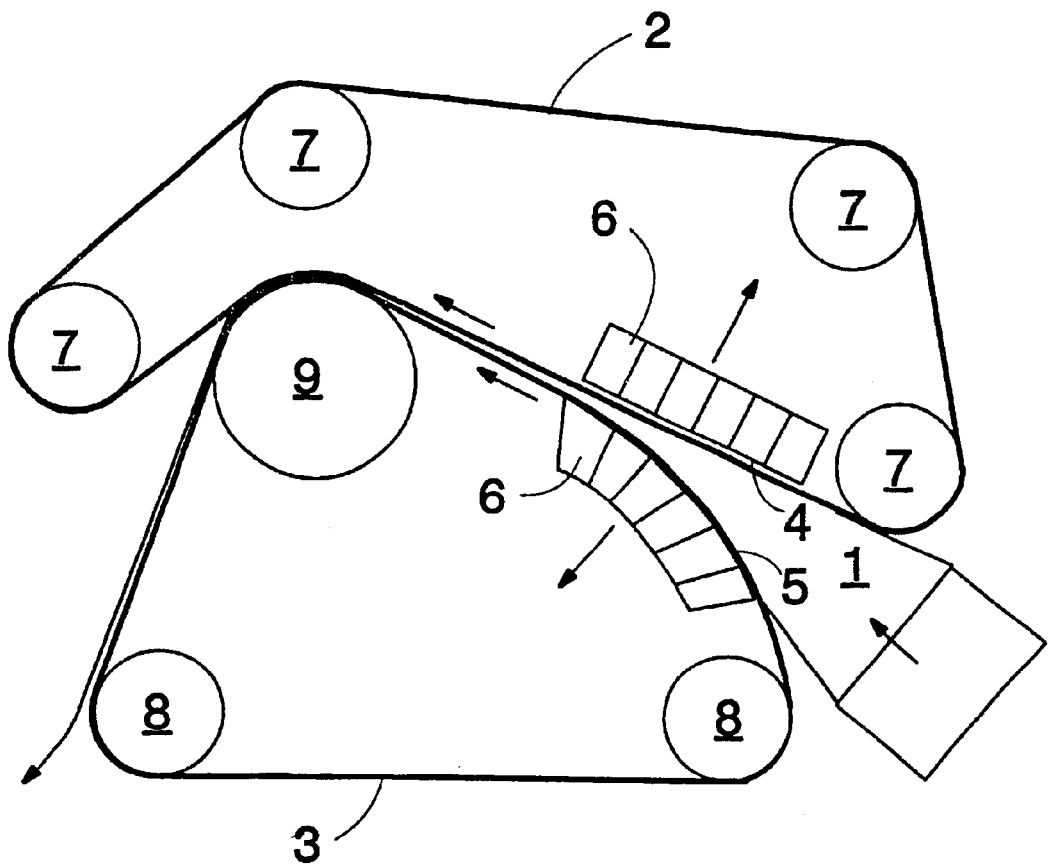
FIG. 1 is a schematic side view of an apparatus of the invention.

FIG. 1 is a schematic view of an apparatus of the invention, wherein water is removed from pulp suspension in order to wash particle-like impurities, such as ash, off the pulp suspension or in order to concentrate the pulp suspension. The apparatus comprises a gap 1 narrowing in the vertical direction. Upper and lower wires 2 and 3 travel along the upper and lower surfaces of the gap, respectively. The pulp suspension is fed between the wires 2 and 3 at the higher end of the gap 1. The pulp suspension flows in the direction of travel of the wires 2, 3 towards the lower end of the gap. Simultaneously, water is removed from the pulp suspension through the wires 2, 3 and further via openings in upper and lower surfaces 4, 5 external to the wires to collecting chambers 6 wherefrom the water and the impurities removed therewith are discharged. The pulp suspension can be fed into the gap in any manner known per se.

Figure 2:
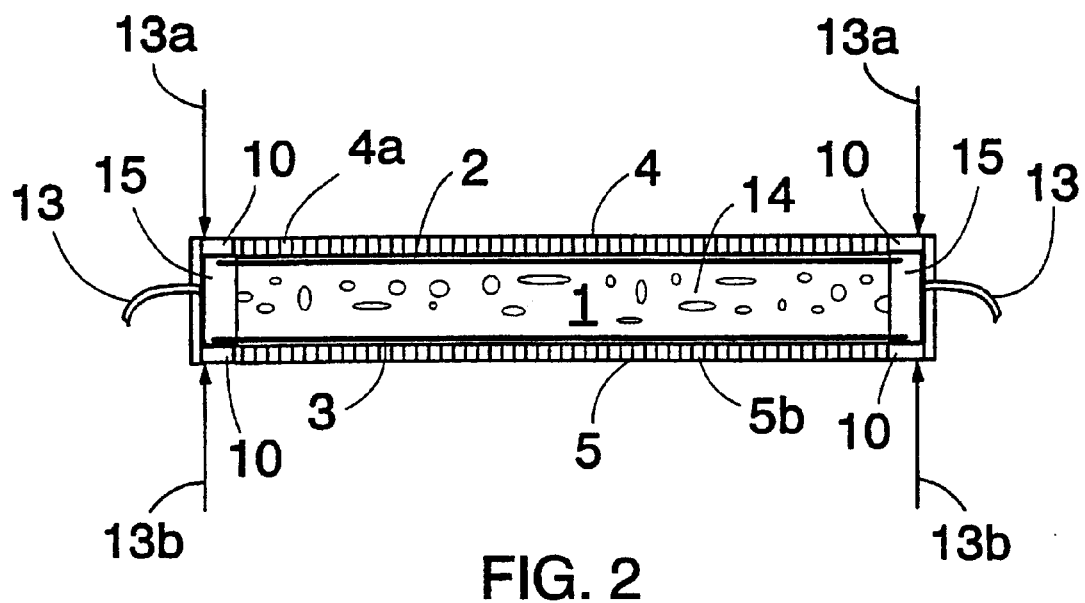
FIG. 2 is a schematic cross-sectional view of the apparatus of FIG. 1 taken along line A—A indicated in FIG. 1.
Figure 3:
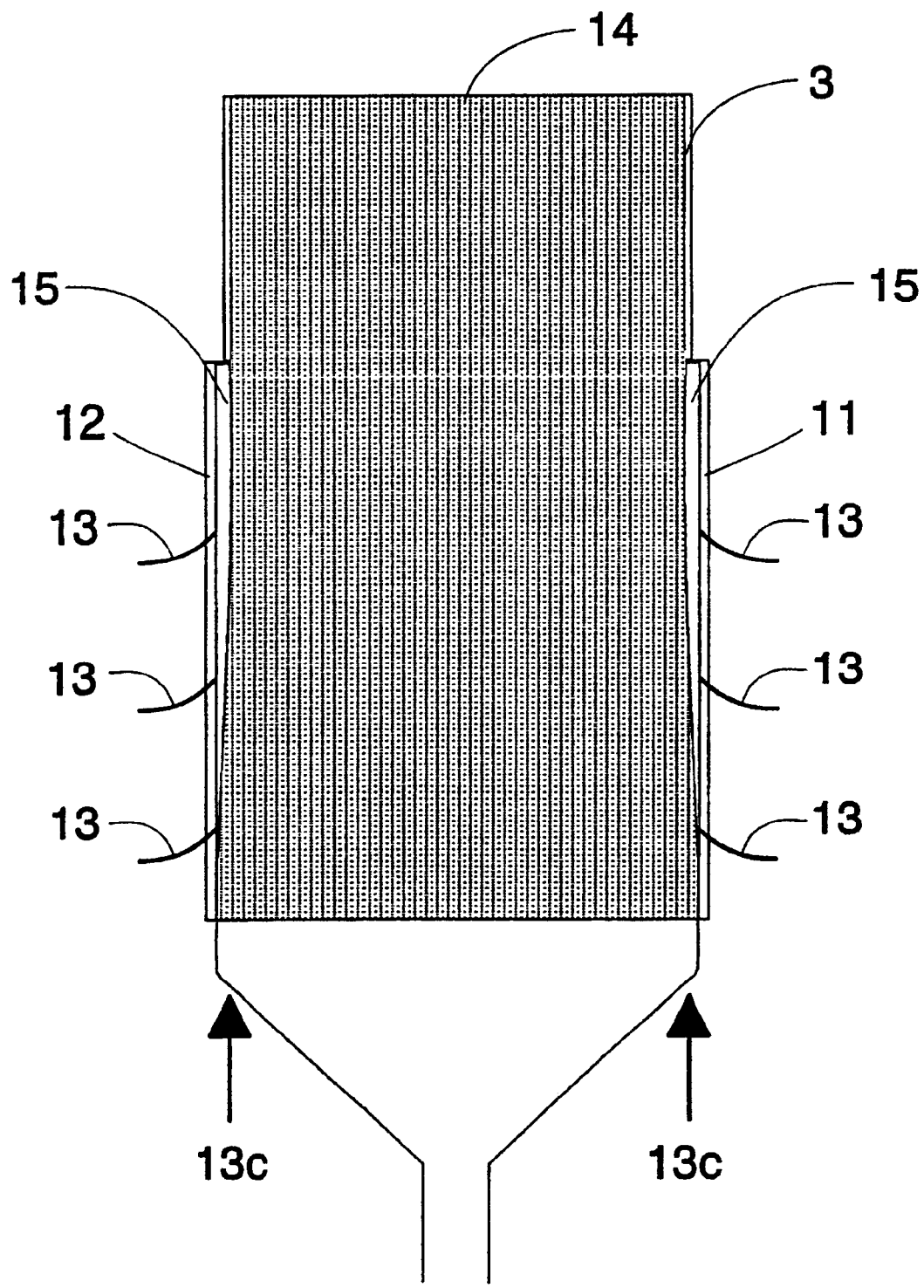
FIG. 3 is a schematic sectional view of the apparatus of FIG. 1 taken along line B—B indicated in FIG. 1.
Figure 1:
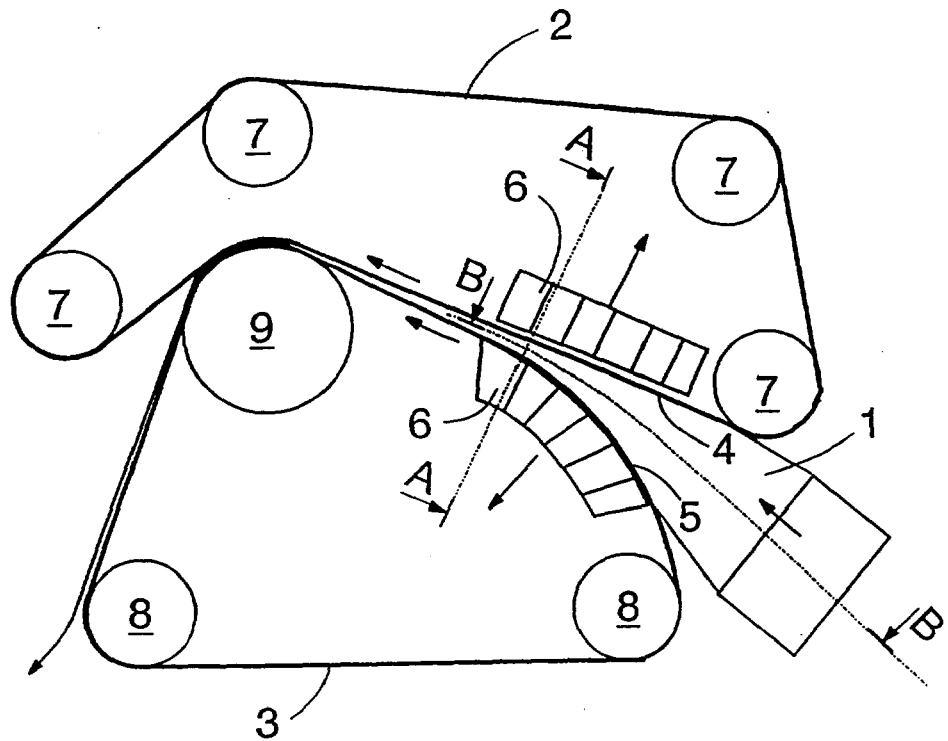
Figure 2:
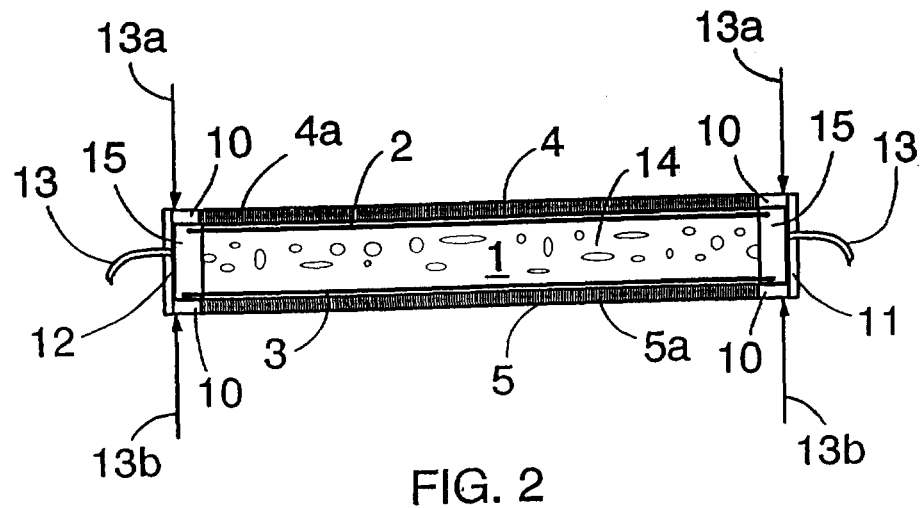

On both sides of the gap there are sides shown in FIGS. 2 and 3 to prevent the pulp suspension from being extruded out from the sides of the gap, and, consequently, the pulp suspension is forced to flow onward with the wires 2, 3 while the water is removed through the wires, the pulp suspension remaining therebetween. Furthermore, the figure schematically shows control rolls 7 and 8 of the wires 2, 3 travelling through the gap, and a turning roll 9 around which the wires rotate to return to the higher end of the gap.

FIG. 2 is a schematic cross-sectional view of the gap of the apparatus in accordance with FIG. 1 taken along line A—A indicated in FIG. 1. As can be seen from the figure, the upper and lower wires 2 and 3 travel against the upper and lower surfaces of the gap, respectively, such that space is left therebetween for the pulp suspension. The upper and lower surfaces 4, 5 of the gap 1 are perforated or otherwise equipped with suitable openings 4a, 5a such that water is allowed to flow therethrough. Furthermore, the edges of the gap comprise solid sections without openings, i.e. edge parts 10. The edges of the wires 2, 3 extend over the edge parts such that water cannot be removed through the upper and lower surfaces at the edges of the wires. The figure also shows how, according to an embodiment of the invention, water feeding channels 13 travel through side parts 11 and 12 of the gap to the side parts of the gap 1 such that water can be fed into the gap via the channels. The figure also shows how an amount of water appropriately fed has caused pulp suspension 14 to penetrate towards the centre of the gap, substantially only water remaining on the edges of the gap. When water is fed into the gap 1 before the outlet opening at the lower end thereof, the supplied water 15 flows together with the pulp suspension 14 towards the outlet opening. Since water is substantially incompressible, it must penetrate from the edge towards the centre of the gap as the height of the gap decreases. Consequently, the water simultaneously pushes the pulp suspension towards the centre of the gap until the point where the water reaches the openings 4a, 5a of the upper and lower surfaces of the gap. As the height further decreases from this point onward towards the outlet opening of the gap, the water is, however, pressed towards the centre of the gap but is allowed to flow out through the openings 4a, 5a in the upper and lower surfaces 4, 5, whereby the edge of the pulp suspension substantially sets at the openings simultaneously with water being removed from the pulp suspension through the wires and the openings in the surfaces. This feature is illustrated in closer detail in FIG. 3. The figure further schematically shows how water can be fed directly from the sides and through the upper and lower surfaces of the gap to the solid sections 10 without openings located in the edges of the surfaces. This is illustrated by arrows 13a and 13b. The feeding of water can then be implemented by only supplying through the cover, by only supplying through the edges or by combining these different feeding alternatives in an appropriate manner.

FIG. 3 is a schematic sectional view of the apparatus of the invention taken along line B—B indicated in FIG. 1. As can be seen in the figure, the pulp suspension covers the gap along the entire width thereof at the feed end of the pulp suspension, i.e. at the higher end of the gap. The figure shows the water feeding channels 13. There can only be one water feeding channel at a suitable distance from the outlet opening of the gap or there can be several ones along the side of the gap. When water is fed from the water feeding channels 13 to the edges of the gap 1, the water 15 sets between the pulp suspension 14 and the side parts 11 and 12 of the gap 1. As the height decreases, the water 14 penetrates towards the centre of the gap 1 until the openings 4a and 5a of the upper and lower surfaces 4 and 5 allow excess water to flow out, the width of the pulp suspension remaining substantially constant. If it is to be ensured that the edge of the pulp suspension is as well-defined as possible simultaneously with the edge of the wire remaining as clean as possible, more water can be fed at a shorter distance from the outlet opening of the gap such that there is always a sufficiency of water at the edges of the gap. The figure further illustrates how water can be fed in the direction of flow of the pulp suspension at the inlet end of the gap at the same time when the pulp is, for example, appropriately fed directly from behind of the gap or from the upper or lower direction to the inlet end. This is illustrated by arrows 13c denoting water feeding channels connected to the points in question. Also this manner of feeding water can be used alone, together with water feeding taking place from the sides, together with the manner of feeding water from the upper and lower surfaces to the solid edge part thereof, or separately, according to the circumstances.

The water supplied to the edges of the gap can either be fresh water or filtrate water removed from the pulp containing a small amount of solid matter, such as fines, etc., since the water does not need be completely pure here. Furthermore, the amounts of water fed can vary depending on the situation, but quite small amounts of water suffice to yield the present desired result. The water feeding channels can either be separate water feeding hoses or fixed channels etc. formed in the sides of the gap. Furthermore, the edges of the upper and lower surfaces of the gap must comprise a solid edge sector of some width in order to prevent the pulp suspension from penetrating under the edges of the wires and to keep it between the wires by feeding water.

What is claimed is:

1. An arrangement for adjusting the width of a fibre web when water is removed from pulp suspension in an apparatus comprising two filter wires permeable to water, the filter wires having the same direction of travel and both wires being arranged to be supported by surfaces equipped with water openings and to form therebetween a gap narrowing in the direction of travel, and side parts located on both edges of the gap to prevent the pulp suspension from being extruded out of the gap in the crosswise direction thereof, openings in the upper and lower surfaces of the gap being formed such that the two surfaces comprise a solid edge part next to the side parts such that the edges of the wires extend over said solid edge parts, and means for feeding the pulp suspension into the gap between the wires in the inlet direction thereof, wherein the arrangement comprises means for feeding water into the gap to the sides thereof such that while flowing together with the pulp suspension towards the outlet opening of the gap, the supplied water pushes the pulp suspension towards the centre of the gap at least substantially as far as to the openings in the upper and lower surfaces.

2. An arrangement as claimed in claim 1, wherein the means for feeding water comprise water feeding channels connected to the side parts of the gap, via which channels water is fed to the edges of the gap via the sides of the gap.

3. An arrangement as claimed in claim 1, wherein the means for feeding water comprise channels for feeding water from the upper and/or lower surface to the solid edge parts of said surface.

4. An arrangement as claimed in claim 1, wherein the means for feeding water comprise channels for feeding water into the gap simultaneously with the pulp suspension to the inlet side of the gap.

5. An arrangement as claimed in claim 1, wherein the arrangement comprises several channels for feeding water to both edges of the gap.

6. An arrangement as claimed in claim 1, wherein the means for feeding water comprise means for feeding fresh water.

7. An arrangement as claimed in claim 1, wherein the means for feeding water comprise means for feeding filtrate water separated from the pulp suspension.

* * * * *

UNITED STATES PATENT AND TRADEMARK OFFICE
CERTIFICATE OF CORRECTION

PATENT NO. : 6,368,463 B1
DATED : April 9, 2002
INVENTOR(S) : Juutinen

It is certified that error appears in the above-identified patent and that said Letters Patent is hereby corrected as shown below:

Title page,
The illustrative figure should be deleted and substitute therefor the attached FIG. 2.

Drawings,
Sheet 1 of 2 should be deleted to be substituted with the attached sheet.

Signed and Sealed this

Seventh Day of January, 2003

JAMES E. ROGAN
*Director of the United States Patent and Trademark Office*

(12) United States Patent  
Juutinen

(10) Patent No.: US 6,368,463 B1
(45) Date of Patent: Apr. 9, 2002

(54) ARRANGEMENT FOR ADJUSTING WIDTH OF FIBRE WEB

(75) Inventor: Vesa Juutinen, Tampere (FI)

(73) Assignee: Metso Paper Inc., Helsinki (FI)

(*) Notice: Subject to any disclaimer, the term of this patent is extended or adjusted under 35 U.S.C. 154(b) by 0 days.

(21) Appl. No.: 09/889,533

(22) PCT Filed: Jan. 18, 2000

(86) PCT No.: PCT/FI00/00037

§ 371 Date: Aug. 23, 2001

§ 102(e) Date: Aug. 23, 2001

(87) PCT Pub. No.: WO00/43588

PCT Pub. Date: Jul. 27, 2000

(30) Foreign Application Priority Data

Jan. 19, 1999 (FI) .................................................. 990103

(51) Int. Cl.[7] .................................................. D21F 1/80
(52) U.S. Cl. .................. 162/301; 162/305; 162/358.1; 100/118; 210/401

(58) Field of Search ................................ 162/297, 301, 162/305, 358.1; 210/400, 401, 450; 100/118

(56) References Cited

U.S. PATENT DOCUMENTS

| | | | | |
|---|---|---|---|---|
| 2,956,623 A | * | 10/1960 | Ikavalko | 162/338 |
| 3,840,429 A | * | 10/1974 | Busker et al. | 162/205 |
| 4,124,441 A | * | 11/1978 | Nykopp | 162/301 |
| 4,802,955 A | * | 2/1989 | Koski | 162/301 |

FOREIGN PATENT DOCUMENTS

| | | | |
|---|---|---|---|
| DE | 539 372 | * | 11/1931 |
| SE | 465 132 | * | 7/1991 |

* cited by examiner

*Primary Examiner*—Dean T. Nguyen
(74) *Attorney, Agent, or Firm*—Alston & Bird LLP

(57) ABSTRACT

An arrangement for adjusting the width of a fibre web in an apparatus comprising two filter wires permeable to water, the filter wires having the same direction of travel, and a conduit for placing pulp suspension between the wires. The arrangement comprises channel for feeding water between the wires and to the edges thereof.

7 Claims, 2 Drawing Sheets

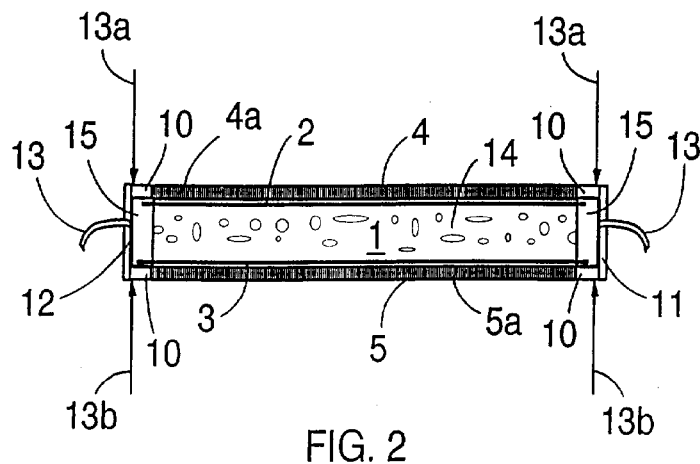

FIG. 2